(12) United States Patent
Chen

(10) Patent No.: US 7,654,785 B2
(45) Date of Patent: Feb. 2, 2010

(54) HIGHER FASTENING SCREW

(75) Inventor: Chi-Hsiang Chen, Kaohsiung Hsien (TW)

(73) Assignee: Zyh Yin Enterprise Co., Ltd., Kaohsiung Hsien (TW)

(*) Notice: Subject to any disclaimer, the term of this patent is extended or adjusted under 35 U.S.C. 154(b) by 144 days.

(21) Appl. No.: 11/925,750

(22) Filed: Oct. 26, 2007

(65) Prior Publication Data
US 2009/0110512 A1   Apr. 30, 2009

(51) Int. Cl.
*F16B 35/04*   (2006.01)
(52) U.S. Cl. .................... 411/421; 411/417
(58) Field of Classification Search ............ 411/417, 411/418, 420, 421
See application file for complete search history.

(56) References Cited

U.S. PATENT DOCUMENTS

| | | | |
|---|---|---|---|
| 1,235,626 A * | 8/1917 | Woodward | 411/421 |
| 1,294,268 A * | 2/1919 | Holmes | 411/421 |
| 2,302,675 A * | 11/1942 | Cherry | 411/421 |
| 2,393,990 A * | 2/1946 | Kamborian | 12/142 R |
| 4,697,969 A * | 10/1987 | Sparkes | 411/387.7 |
| 7,063,491 B2 * | 6/2006 | French | 411/387.8 |
| 2004/0253076 A1 * | 12/2004 | French | 411/417 |

* cited by examiner

*Primary Examiner*—Gary Estremsky
(74) *Attorney, Agent, or Firm*—Banger Shia

(57) ABSTRACT

The present invention pertains to a high-speed fastening screw comprising a plurality of concavities on the threads connected in sequence in a single helix. Further, the concavities separately located adjacent to the screw head and to the drilling portion are disposed at relative positions for aligning with an imaginary line, hence efficiently cutting and severing the object fibers to enhance a screwing efficiency.

2 Claims, 6 Drawing Sheets

HIGHER FASTENING SCREW

BACKGROUND OF THE INVENTION

1. Field of the Invention

The present invention relates to a screw, in particular, a high-speed fastening screw.

2. Description of the Related Art

Referring to FIG. 1, a conventional screw 1 comprises a screw head 10, a shank 11 extending from the head 10 along a shank axis "θ", a drilling portion 13 disposed at the distal end of the shank 11, and a plurality of threads 12 disposed on the shank 11; wherein each of the threads 12 provides with a notch 121 disposed around the outer edge thereof, and a plurality of the notches 121 are assumed to be sequentially joined by an imaginary line "a", started from an initial notch "c" located adjacent to the drilling portion 13 to a final notch "d" located adjacent to the screw head 10, which results in the line "a" being inclined with respect to the shank axis "θ" by an angle "ρ".

While screwing, the screw 1 is initially drilled into the object through the drilling portion 13 and the threads 12, and further the notches 121 assist to cut the fibers and receive the debris (not shown in the figures). By means of the inclination of the imaginary line "a" and the smaller angle "ρ" in FIG. 1, the notches 121 solely spread around part of the shank 11 (shown in end view of FIG. 2) and can not thoroughly cut off the fibers of the object. Thereafter, the unsevered fibers would be facilely twisted round the shank 11, which increases the screwing resistance and affects the screwing efficiency.

To solve the aforementioned problems, some manufacturers may intend to dispose a plurality of notches 221 on each of the threads 22, as shown in FIG. 3. However, the more notches 221 are on the threads 22, the less dimension of each notch 221 is. The notches 221 with smaller dimensions would not substantially cut and sever the fibers, which causes fibers to be twisted round the shank and accumulated within the object and furthers the object easily to be destroyed. In addition, the configuration of multiple notches 221 on the threads 22 may also cause injuries to the operators while screwing. Thus, screw 1 and 2 still requires further improvements.

SUMMARY OF THE INVENTION

Therefore, the object of the present invention is to provide a screw comprising a plurality of concavities disposed on the threads for being sequentially connected as a state of a single helix, thereby assisting to thoroughly and sequentially sever fibers for reducing the screwing resistance and for reducing potential injury to the operators.

The screw in accordance with the present invention comprises a screw head, a shank, a drilling portion and a plurality of threads; wherein a plurality of concavities on the threads are sequentially connected to transversely form a single helix around the shank with an initial concavity longitudinally aligning with respect to a final concavity by an imaginary line. With the help of the concavities to cut and sever the fibers, the present invention increases the screwing efficiency by reducing screwing resistance and also introduces a more user-friendly interface for the operators.

The advantages of the present invention over the known prior art will become more apparent to those of ordinary skilled in the art upon reading the following descriptions in junction with the accompanying drawings.

DETAILED DESCRIPTION OF THE PREFERRED EMBODIMENTS

Figure 2:
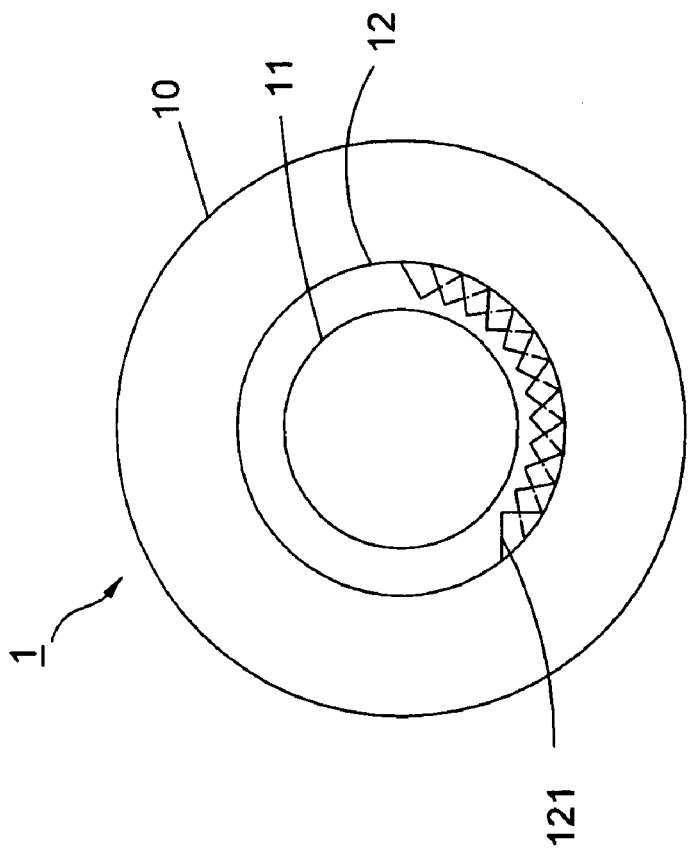
FIG. 2 is an end view showing the screw of FIG. 1.
Figure 1:
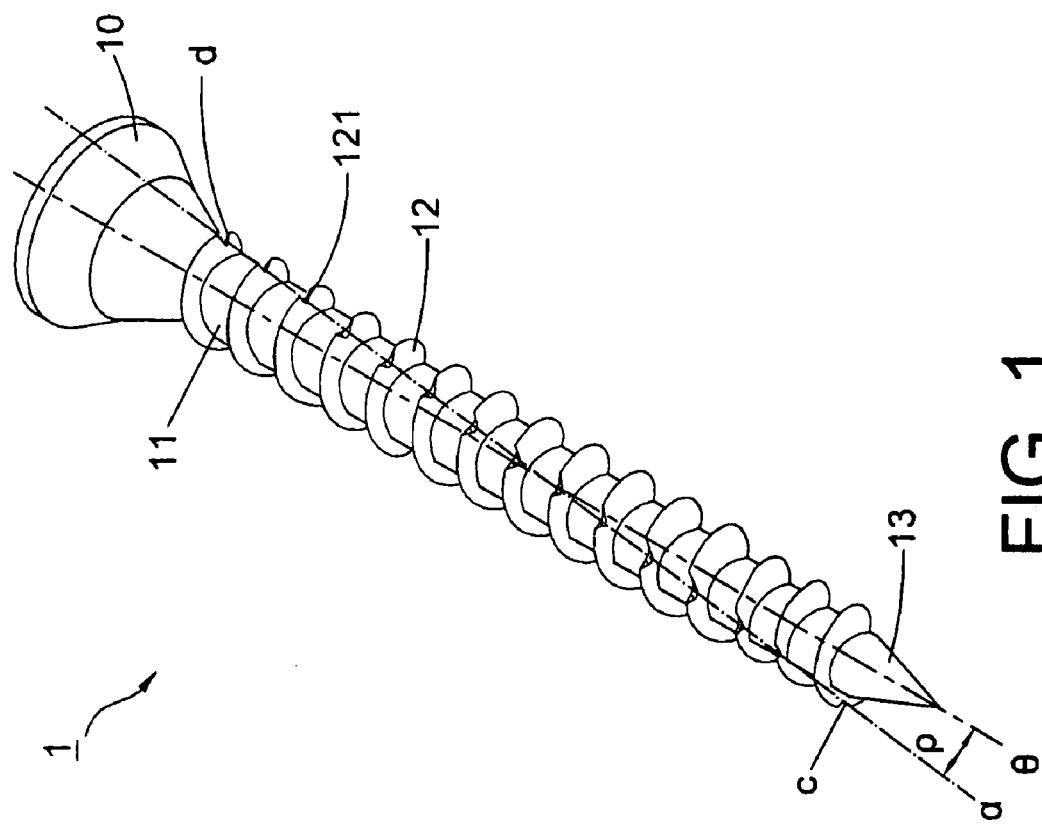
FIG. 1 is a perspective view showing a conventional screw.
Figure 3:
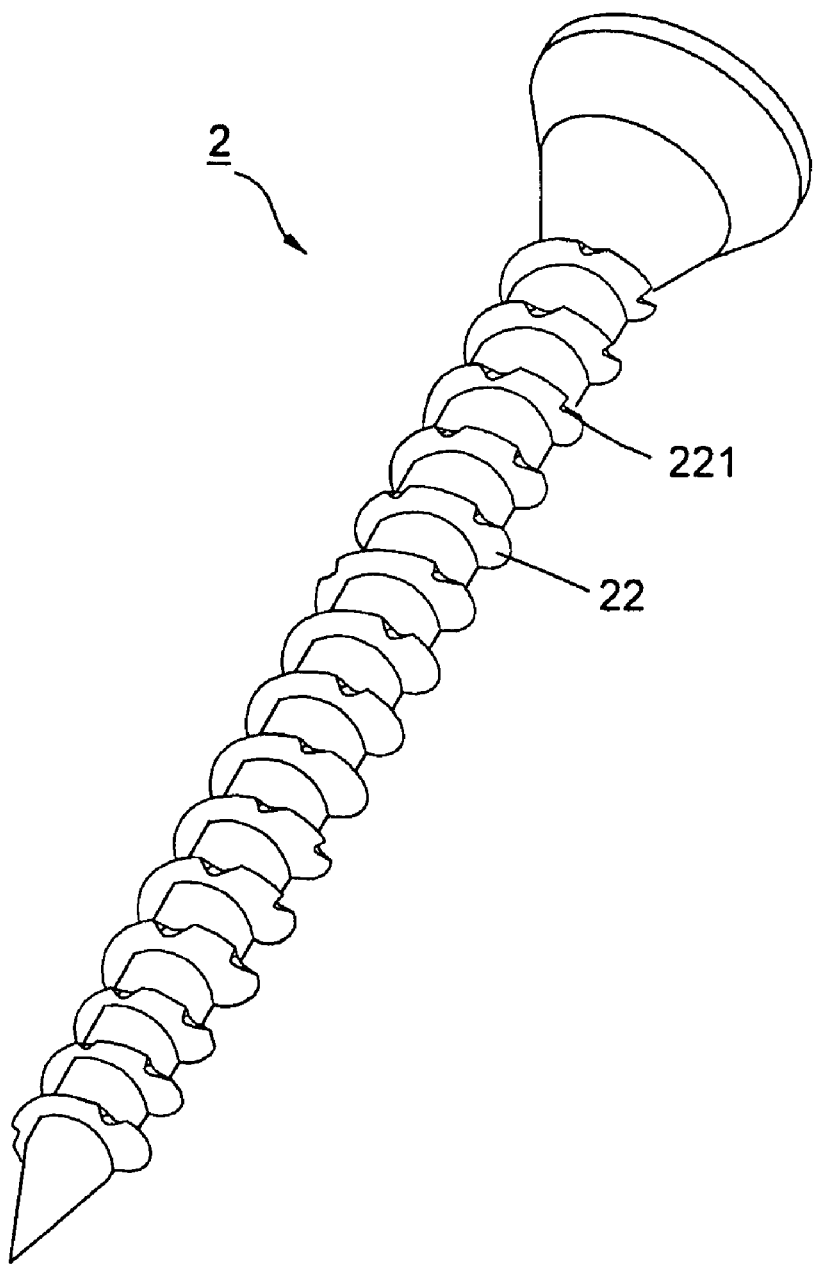
FIG. 3 is a perspective view showing another conventional screw.

Like elements in the present invention are denoted by the same reference numerals throughout the disclosure.

Figure 4:
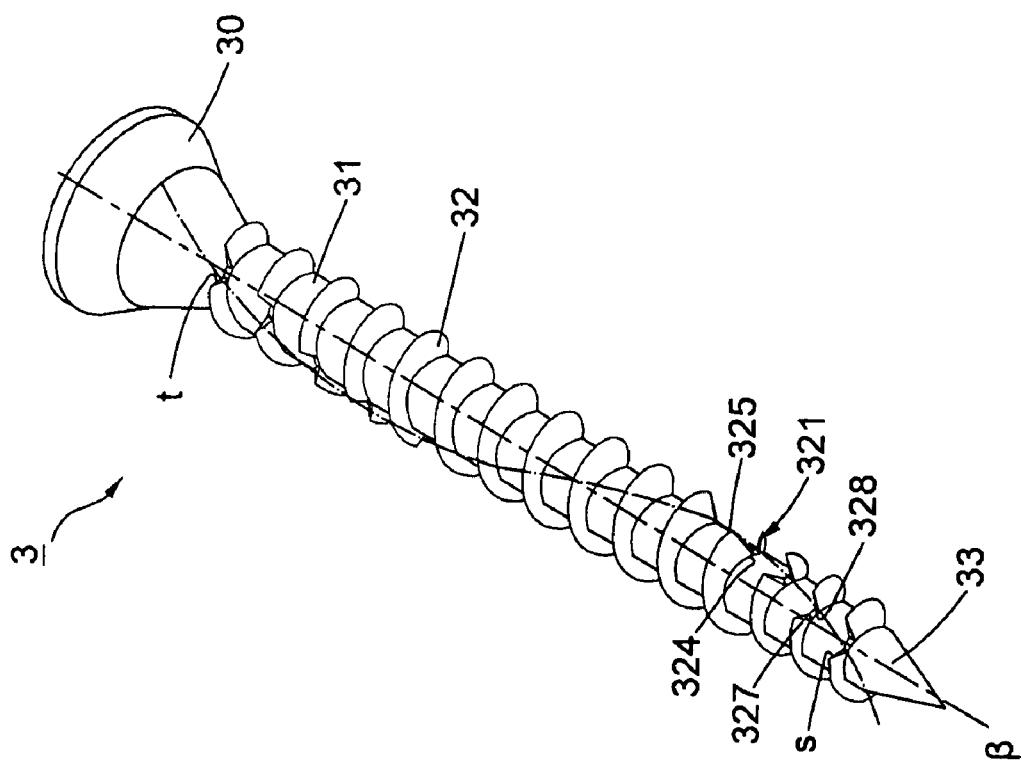
FIG. 4 is a perspective view showing a screw of a first preferred embodiment of the present invention.
Figure 6:
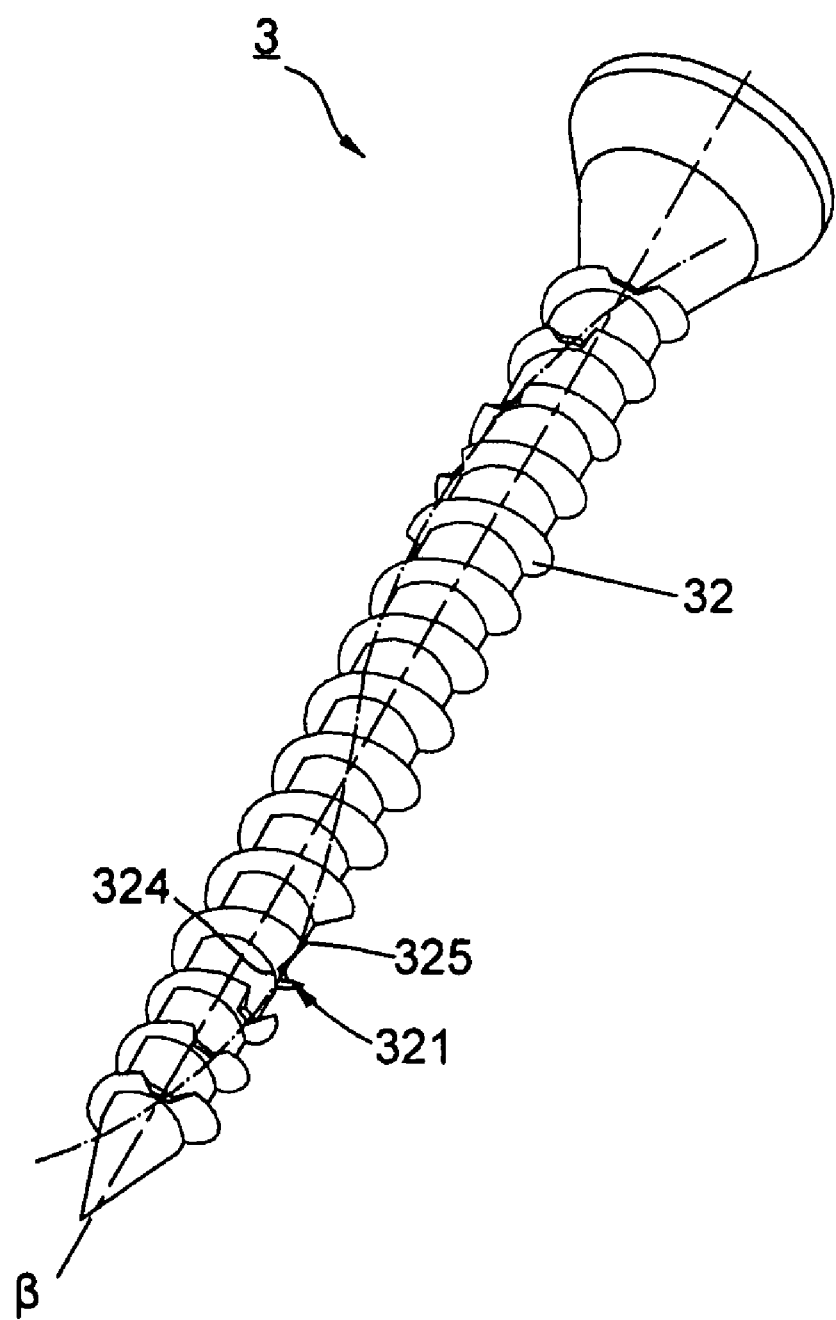
FIG. 6 is a perspective view showing a screw of a second preferred embodiment of the present invention.

Referring to FIG. 4, a screw 3 of a first preferred embodiment comprises a screw head 30, a shank 31 longitudinally extending from the screw head 30, a drilling portion 33 disposed on the distal end of the shank 31, opposite to the screw head 30, and a plurality of threads 32 disposed on the shank 31; wherein each of threads 32 consists of a thread bottom 324 joined to the shank 31 and a thread crest 325 outwardly protruded from the shank 31. Further, a concavity 321 is defined from a periphery of the thread crest 325 toward the thread bottom 324 to form a bottom wall adjacent to the thread bottom 324 (shown in a second preferred embodiment of FIG. 6). It is adopted in the preferred embodiments of the present invention that the each of the concavities 321 is extensively depressed to contact with the surface of the thread bottom 324 (shown in FIG. 4), which results in that the concavity 321 has the bottom wall corresponding to the thread bottom 324 and defines two flanks 327 and 328 separately extending to meet the thread bottom 324. In this manner, the cross-sectional view of a concavity 321 would be presented as a trapezoid contour shown in the figures of the present invention.

Figure 5:
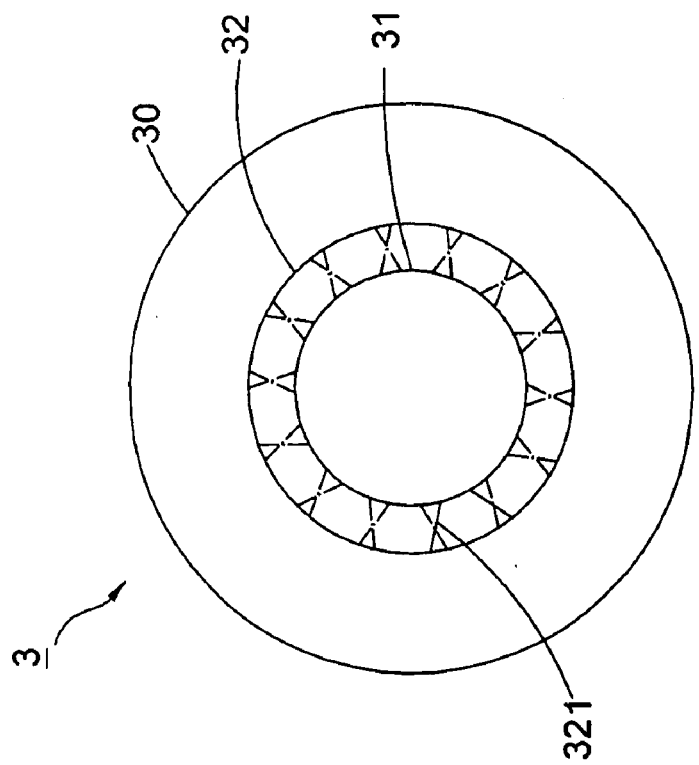
FIG. 5 is an end view showing the screw of FIG. 4.

Still further, the concavities 321 on the threads 32 are sequentially connected in the shape of a single helix around the shank 31 in cross section, started from an initial concavity "s" located adjacent to the drilling portion 33 and terminated at a final concavity "t" located adjacent to the screw head 30. Moreover, the initial concavity "s" and the final concavity "t" are disposed at relative positions, whereby the initial concavity "s" is accurately aligned with the final concavity "t" by an imaginary line "β", so that the threads 32 with respect to the imaginary line "β" are not interrupted, and the concavities 321 are defined to be overall spread around the shank 31 (shown in the end view of FIG. 5).

Figure 7:
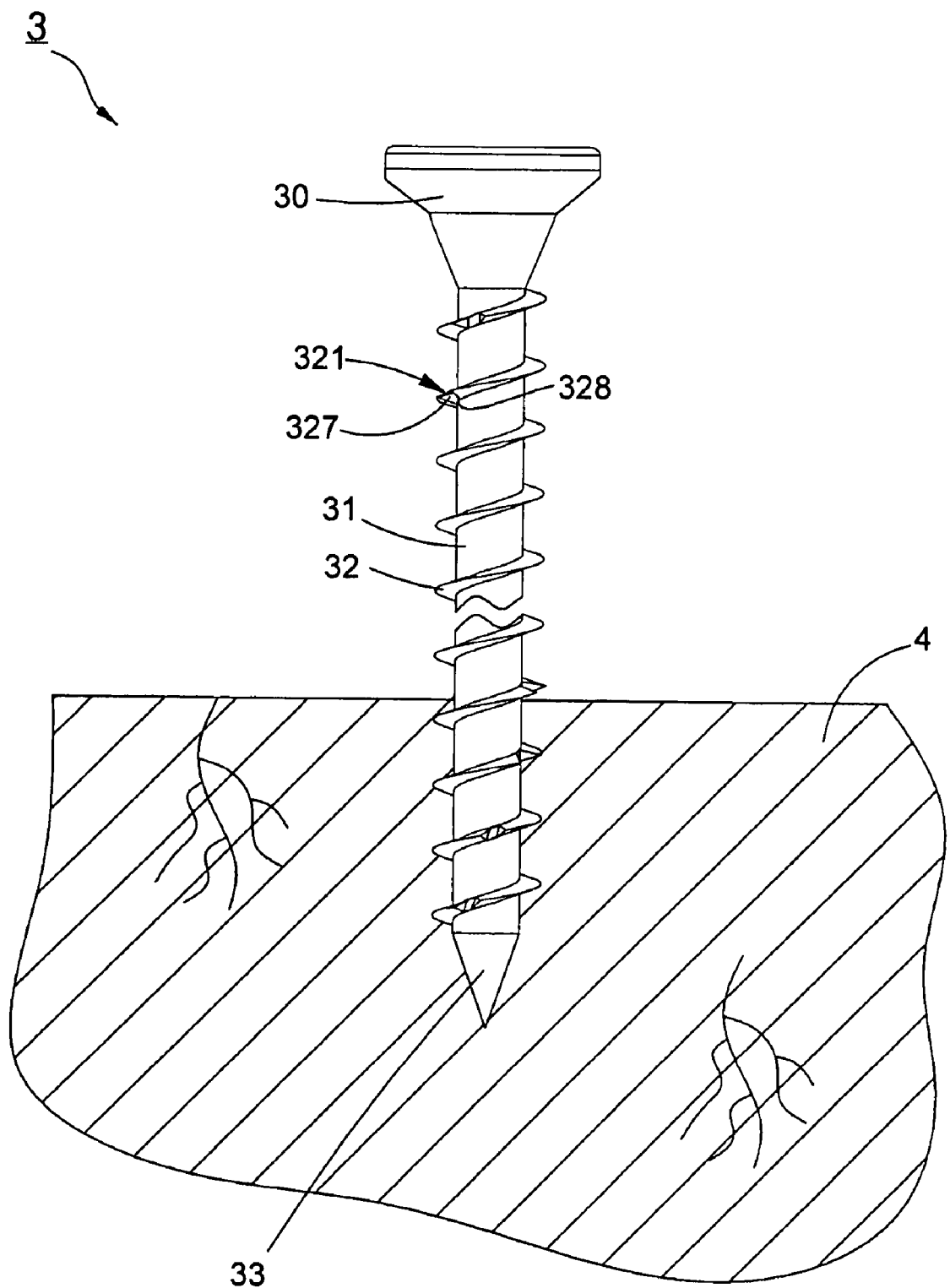
FIG. 7 is a schematic view showing the screw of the first preferred embodiment to be screwed into the object.

Referring to FIG. 7, in manipulation, an operator holds the screw 3 by steadily gripping the shank 31 and the threads 32 and further transfers a force upon the screw head 30, so that the screw 3 is drilled into the object 4 by the drilling portion 33 with the threads 32 for cutting the fibers of the object 4. In the mean time, by means of the concavities 321 on threads 32 spreading around the shank 31, the flanks 327 and 328 of the concavity 321 thus aid in continuously cutting and severing the fibers of the object 4 and gradually guiding the debris out, so as to prevent the unsevered fibers from being twisted round the shank 31 and causing the destruction of the object 4.

Further, the configuration of the concavities 321 connected as a state of a single helix would also improve the problem of the injuries to the operator, for instance of reducing the cases of hurting the operator's hands while gripping the screw 3.

Figure 8:
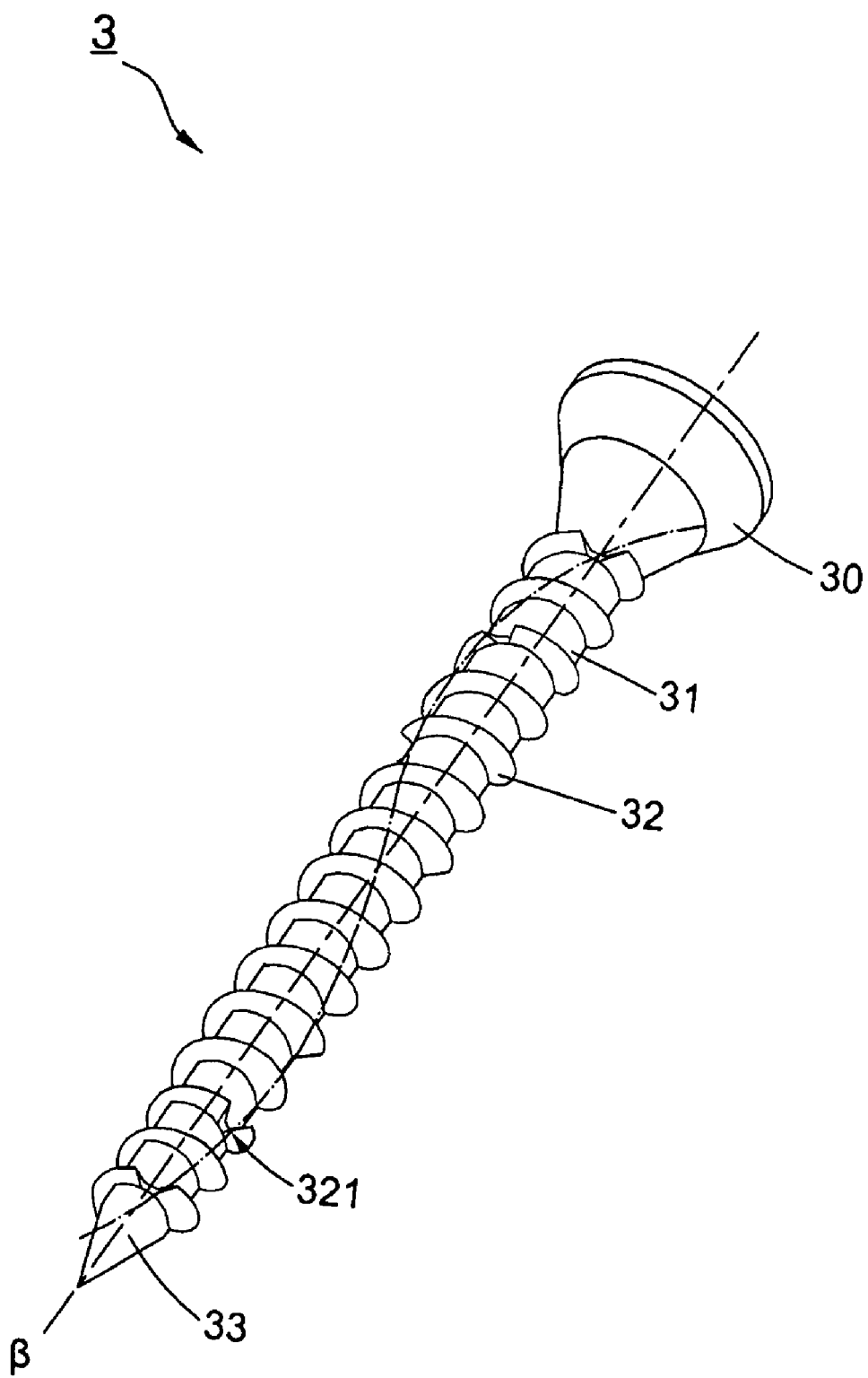
FIG. 8 is a schematic view showing a screw of a third preferred embodiment of the present invention.

Referring to FIG. 8, a screw 3 of a third preferred embodiment comprises a similar configuration like the first preferred embodiment. Specifically, the concavities 321 are disposed at an interval of one thread 32 between any of the two threads 32 and still connected in a single helix around the shank 31, which helps cutting the fibers by reducing screwing resistance with a higher screwing speed and hence enhancing the screwing stability. Also, the fewer amounts of the concavities 321 on threads 32 facilitate to decrease the possibility of the injuries to the operators.

To sum up, the present invention takes advantages of the concavities on the threads overall spreading around the shank, so as to cooperate with threads to sequentially sever the fibers into debris and to prevent the fibers from being twisted round the shank. As a result, the present invention reduces the screwing resistance for a higher screwing efficiency and avoids hurting the operators while screwing.

While we have shown and described the embodiment in accordance with the present invention, it should be clear to those skilled in the art that further embodiments may be made without departing from the scope of the present invention.

I claim:

1. A high-speed fastening screw comprising:
 a screw head;
 a shank longitudinally extending from said screw head;
 a plurality of threads spirally disposed on said shank;
 wherein each of said threads including a thread bottom joined to said shank and a thread crest outwardly protruded from said shank; and
 a drilling portion disposed on a distal end of said shank, opposite to said screw head;
 wherein said thread crest being inwardly depressed from a periphery thereof toward a surface of said thread bottom to define a concavity and two flanks separately extending to meet said thread bottom; a plurality of said concavities on said threads being longitudinally arranged as a single helix spreading around said shank in cross section, started from an initial concavity adjacent to said drilling portion and terminated at a final concavity adjacent to said screw head; said initial concavity and said final concavity being exactly aligned with said final concavity by an imaginary line, and said threads with respect to said imaginary line being constructed without interrupting.

2. The screw as claimed in claim 1, wherein said concavities are disposed at an interval of one thread between any of said two threads.

* * * * *